US010434417B1

(12) United States Patent
Durkin et al.

(10) Patent No.: US 10,434,417 B1
(45) Date of Patent: Oct. 8, 2019

(54) CHANGING USER EXPERIENCE USING APPLICATION EVENTS AND SELECTED ACTIONS

(71) Applicant: Amazon Technologies, Inc., Seattle, WA (US)

(72) Inventors: Ryan Newcomb Durkin, Long Beach, CA (US); Timothy Jason Berger, San Bernardino, CA (US); Jean-Yves Pip Courbois, Seattle, WA (US); Ian Christopher Suttle, Tustin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/811,624

(22) Filed: Nov. 13, 2017

Related U.S. Application Data

(63) Continuation of application No. 14/480,798, filed on Sep. 9, 2014, now Pat. No. 9,844,725.

(51) Int. Cl.
| | |
|---|---|
| *A63F 13/69* | (2014.01) |
| *A63F 13/537* | (2014.01) |
| *A63F 13/61* | (2014.01) |
| *G06Q 30/06* | (2012.01) |
| *G06Q 30/02* | (2012.01) |
| *G06F 9/54* | (2006.01) |
| *H04L 29/08* | (2006.01) |

(52) U.S. Cl.
CPC ............ *A63F 13/69* (2014.09); *A63F 13/537* (2014.09); *A63F 13/61* (2014.09); *G06F 9/542* (2013.01); *G06Q 30/0277* (2013.01); *G06Q 30/0601* (2013.01); *H04L 67/10* (2013.01); *H04L 67/16* (2013.01)

(58) Field of Classification Search
CPC ........ A63F 13/69; A63F 13/537; A63F 13/61; G06F 9/542; H04L 67/10; H04L 67/16; G06Q 30/0277; G06Q 30/0601
USPC .......................................................... 463/42
See application file for complete search history.

(56) References Cited

U.S. PATENT DOCUMENTS

| | | |
|---|---|---|
| 8,469,805 B2 | 6/2013 | Kilgore et al. |
| 2004/0127277 A1 | 7/2004 | Walker et al. |
| | (Continued) | |

OTHER PUBLICATIONS

Office action for U.S. Appl. No. 14/480,798, dated Oct. 27, 2016, Durkin et al., "Changing User Experience Using Application Events and Selected Actions", 12 pages.

(Continued)

*Primary Examiner* — Allen Chan
(74) *Attorney, Agent, or Firm* — Lee & Hayes, P.C.

(57) ABSTRACT

Functionality is disclosed herein for changing a user experience using application events. Events that occur while an application is executing are provided to an application service. The events may be stored on the computing device executing the application before the events are provided to the application service. The application service uses the events to generate a plan that includes data identifying one or more actions for the application to perform. The events used to generate the plan may include events received from other users who also interact with the application. The plan is used by an application to select one or more actions to perform to move the user interacting with the application closer to a goal state. The plan may be periodically updated.

19 Claims, 9 Drawing Sheets

(56) References Cited

U.S. PATENT DOCUMENTS

| | | | |
|---|---|---|---|
| 2007/0066403 A1* | 3/2007 | Conkwright | A63F 13/10 463/43 |
| 2008/0268943 A1* | 10/2008 | Jacob | A63F 13/10 463/23 |
| 2010/0144424 A1* | 6/2010 | Rogers | A63F 13/10 463/23 |
| 2010/0267443 A1 | 10/2010 | Shimamura et al. | |
| 2010/0331089 A1 | 12/2010 | Priebatsch et al. | |
| 2011/0250971 A1 | 10/2011 | van Os et al. | |
| 2013/0005471 A1 | 1/2013 | Chung et al. | |
| 2013/0079156 A1 | 3/2013 | Koyama et al. | |
| 2013/0225260 A1* | 8/2013 | Cudak | A63F 13/12 463/23 |
| 2013/0324259 A1 | 12/2013 | McCaffrey et al. | |
| 2014/0080556 A1* | 3/2014 | Knutsson | A63F 13/12 463/7 |

OTHER PUBLICATIONS

Office action for U.S. Appl. No. 14/480,798, dated May 16, 2016, Durkin et al., "Changing User Experience Using Application Events and Selected Actions", 11 pages.

* cited by examiner

CHANGING USER EXPERIENCE USING APPLICATION EVENTS AND SELECTED ACTIONS

CROSS-REFERENCE TO RELATED APPLICATION

This application is a continuation of and claims priority to U.S. patent application Ser. No. 14/480,798, filed on Sep. 9, 2014, entitled "Changing User Experience Using Application Events and Selected Actions", the entire contents of which are incorporated herein by reference.

BACKGROUND

These days there are a large number of software applications that are available to users of mobile computing devices. Many of these applications are available free of charge or at a low cost as compared to traditional desktop software applications. A user might obtain these applications from an electronic marketplace. For example, a user might wirelessly connect to the electronic marketplace, browse the available applications and download selected applications.

One popular category of application downloads from electronic marketplaces are video games. For example, a user might be able to choose from among thousands of available video games. Once a user downloads and starts playing the game, it can be challenging to keep the user interested in playing the game. For example, a user playing a video game might become bored or the video game might be too challenging for the user. When a game is too challenging for the user, the user may become disheartened and may give up before they are able to succeed in the game.

Developing games that keep the interest of players over an extended period can be challenging. For example, not all players of a game may be able to complete each of the levels of a game. As such, the player might give up and stop playing the game. In some cases, when a user stops playing a game, payments to the software provider might also stop. For instance, a software provider might be paid for advertisements that are displayed while the user is playing the game.

It is with respect to these and other considerations that the disclosure made herein is presented.

DETAILED DESCRIPTION

Figure 1:
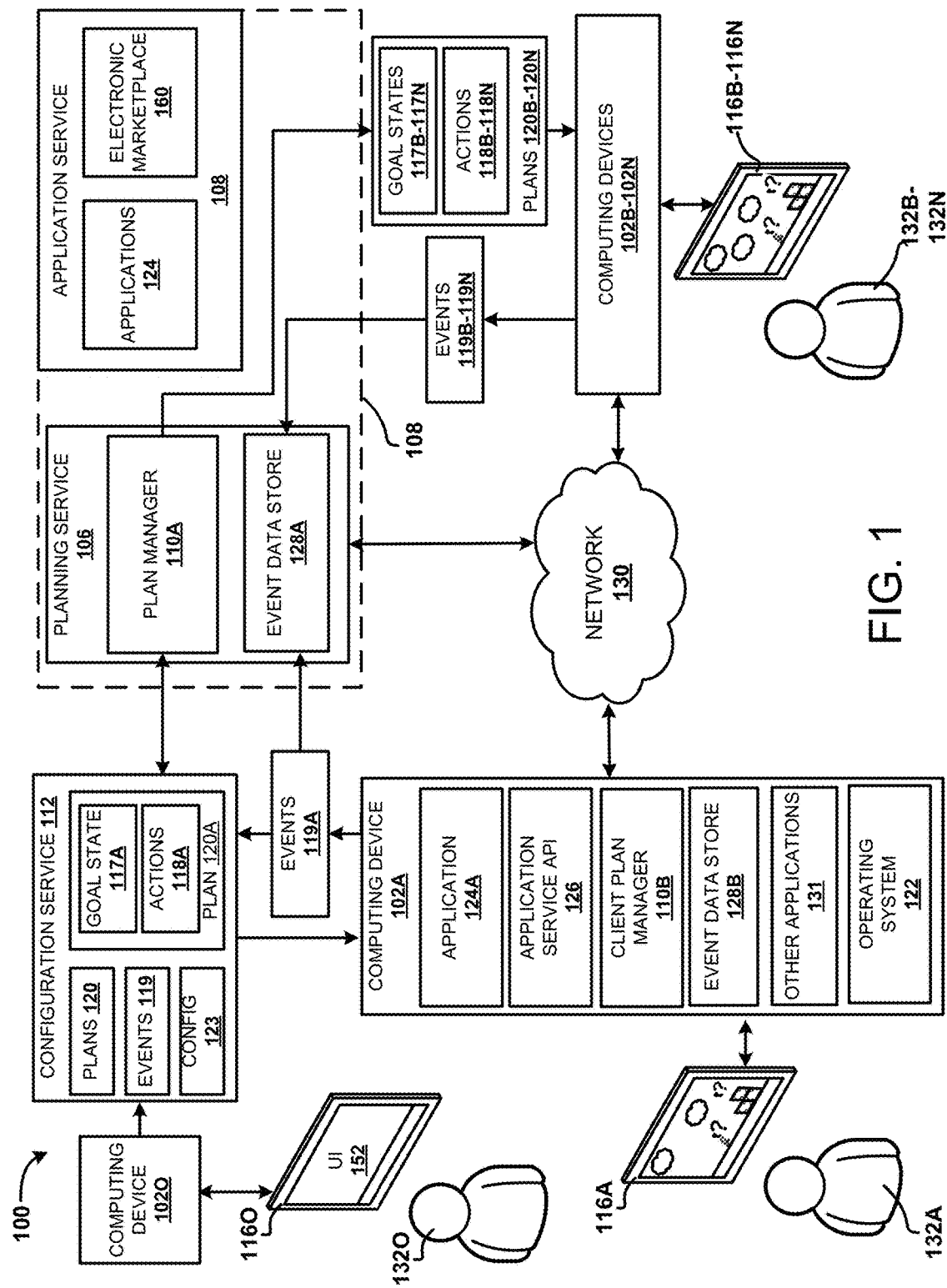
FIG. 1 is a block diagram depicting an illustrative operating environment in which a user experience may be changed using application events and selected actions.

The following detailed description is directed to technologies for changing a user experience during execution of an application using the occurrence of events and selected actions to be performed by the application. Through an implementation of the technologies disclosed herein, the actions that are performed by an application, such as a video game application, may dynamically change based at least in part on events that occur during execution of the application.

Rather than hard coding specific application behavior, software developers may dynamically change application behavior by writing programming code for the application in a way that dynamically selects and performs actions based on one or more events that occur when executing the application. In some examples, the application may be developed using a software developer toolkit ("SDK") that may include an application programming interface ("API") that specifies functionality for connecting the application to a configuration service or application service as well as other tools that might be used by a software developer to develop a game.

In some examples, the application broadcasts events that occur within the application that are received by a plan manager. The events might be stored on the computing device executing the application before the events are obtained by another computing device that is part of the application service or the configuration service. The events that are broadcast may be predefined events (e.g., events that are defined by the SDK) or events that are defined by the software developer (e.g., using the SDK or changed using the configuration service). The predefined events might change based on the type of application. For instance, example predefined events for a game might include when a user begins playing the game, when the user accesses the electronic marketplace, when the user makes a purchase, when the user shares an achievement (or other data) with other users, when the user accesses help, and the like. Examples of events that might be defined by the software provider for a game might include when a player character dies in the game, moves to a next level, encounters a specified character in the game, acquires a new skill, and the like. Generally, an event might relate to any state of the application that may be specified.

In some cases, events from the application are provided to the configuration service and/or the application service when a network connection is established between the computing device executing the application and a remote computing device that is part of the application service or the configuration service. In some examples, a client plan manager is configured to attempt to establish a connection with a plan manager operating in conjunction with the application service during a time the application is executing on the computing device. In other examples, a network connection may not be able to be established while the application is executing. In these cases, a network connection may be established at some point after the application has begun execution.

A plan manager that is part of the application service may generate a plan using the received events that may be used by the application when selecting actions to perform. Instead of the software developer having to manually code in all of the different scenarios that different users might encounter in the application, such as a game, and having to manage each behavior, the application service may provide plans that provide one or more paths that might be taken by the application to reach a goal state or to assist the user to reach the goal state. In some cases, the plan may be customized for a user of the application. The plan manager might also detect patterns of actions that move the application from one state to another state using the received events. The patterns might be detected using events obtained from a single application or the patterns might be detected from aggregated events that are obtained from other computing devices where the application is executed.

Using the detected patterns, the plan manager may determine the next action, or set of actions, that is to occur within the application. These determined actions may be placed into the plan that is provided to the application. The plan manager might also make a determination as to which actions, when performed, better result in a desired outcome (e.g., move closer to a "goal state"). The actions, when performed, may move the user or the application closer to the goal state by changing application functionality. For example, in response to receiving a die event from a game currently being executed on a computing device, the plan manager might cause or instruct the game to display a hint (e.g., perform a hint action) that helps the user learn how to complete the level or perform some other action. In other cases, the plan manager might instruct the game to decrease the difficulty level of the game or provide the character in the game with an added skill. In still other cases, the plan manager might instruct the game to access an electronic marketplace in an attempt to move the user toward purchasing one or more products.

Generally, the plans that are determined by the plan manager and provided to the application by the application service are directed to moving the application and the user toward one or more goal states. For example, if a goal state is to complete a level of a game, the plan manager may determine whether an action to decrease the difficulty is better to perform, or whether an action to provide a new skill to the player or possibly performing both actions is better. The plans provided by the plan manager may be different for users executing the game. For example, one game might utilize a plan that includes an action to display a message whereas another game might use a plan that recommends performance of an entirely different action (e.g., display a promotion screen rather than display a hint).

The application that is currently executing on the computing device may select actions to perform from a plan determined by the application service. In some examples, the application service provides plans that include different actions to different applications in order to help determine what actions, when performed, result in a user moving closer to a goal state. For example, one plan may specify an action to decrease the difficulty of the game to help a user complete the level whereas another plan might specify increasing a skill level of the user to better assist the user in completing the level. These different plans might be performed in parallel by different application executed on different computing devices to obtain a faster analysis by the application service. In another example, the configuration service may change the configuration of the application based at least in part on the plan.

A goal state might be any defined goal or objective for the application or the user executing the game. For example, a game developed using the SDK may be associated with a goal state for a user to complete a level of a game, to complete the level of a game within a specified period of time, to extend the duration of a gaming session, to increase a skill level, to buy more accessories, to buy a certain dollar amount of accessories, and the like. The plan may be used move the user and/or the application toward the goal state.

The application may periodically connect with the application service to provide further events to the application service and possibly to obtain an updated plan. As a user progresses through the application and changes from one state to another state, the plan for the application may be updated. For example, a plan that worked for a particular user to succeed at one task may be updated when the user progresses in skill level. As such, the application periodically obtains new plans or actions from the application service to move closer to the goal state.

By organizing application mechanics through the use of actions in response to events, software developers might customize their applications to assist in maximizing retention and monetization for a group or individual users. Using the technologies described herein, a software provider may be able to keep an application more interesting to a user for a longer period of time as compared to an application that does not dynamically select actions to perform.

Plan analytics may also be provided to the software provider, or some other authorized user, that relate to the plan or plans that are associated with an application. For example, the plan analytics might be displayed in a graphical user interface ("GUI") and include information such as, but not limited to usage data (e.g., average use, average session length), revenue data (e.g., dollars spent on accessories, upgrades), goal state data (e.g., time to reach goal state, number of users achieving the goal state), and the like. In some examples, the software provider may view information about different plans that are associated with the application. For example, the software provider may view the plan analytics to compare how effective each plan that is associated with an application. The plans might be compared to customers executing the application that are not following a plan (e.g., a control group). Additional details regarding the various components and processes described above for changing user experience using application events and selected actions will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

Referring now to FIG. 1, an operating environment 100 is illustrated in which a user experience may be changed using application events and selected actions according to various embodiments presented herein. The operating environment 100 shown in FIG. 1 includes computing devices 102A-102O, an application service 108, a planning service 106, and a configuration service 112.

According to some embodiments, the computing devices 102A-102O, which may be referred to as "computing devices 102", may each be configured as a tablet computing device, a personal computer ("PC"), a desktop computer, a laptop computer, a notebook computer, a cellular phone or smartphone, other mobile computing devices, a personal digital assistant ("PDA"), video game system, set-top box, smart television, or the like.

Figure 7:
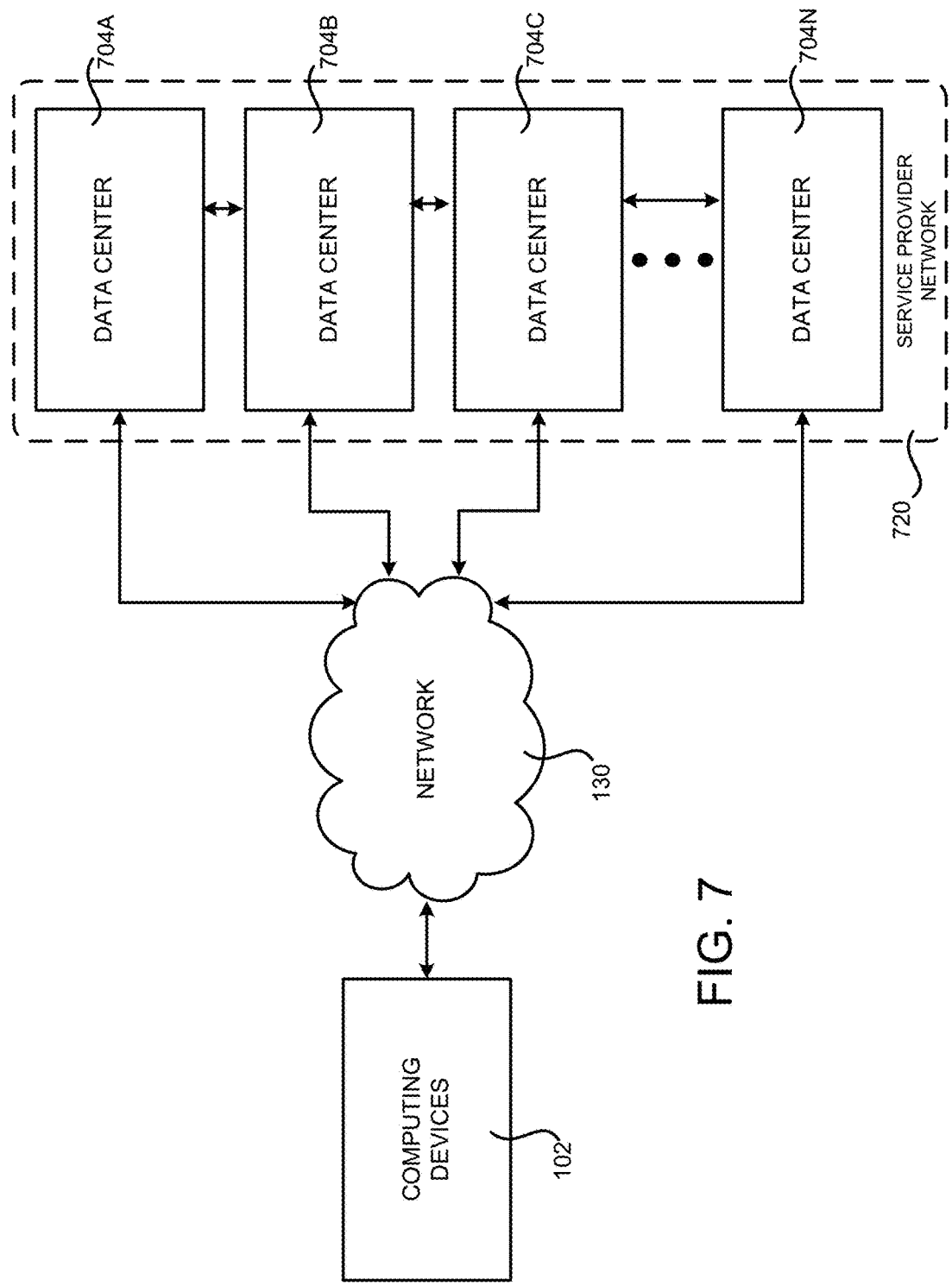
FIG. 7 is a system and network diagram that shows one illustrative operating environment for the embodiments disclosed herein that includes a service provider network.

According to other examples, at least a portion of the functionality of the computing devices 102 may be provided by the application service 108 or a service provider network (See the service provider network 720 illustrated in FIG. 7). The application service 108, the planning service 106, the configuration service 112 or the service provider network 720 may include one or more application servers, Web servers, data storage systems, network appliances, dedicated hardware devices, and/or other server computers or computing devices. In these embodiments, the computing devices 102 can include minimal hardware for connection to a network-based computing platform via a network 130.

The computing devices 102 may communicate via the network 130 to access various services or computing resources described herein. For example, the computing devices 102 can access the planning service 106, the application service 108 and/or the configuration service 112. The functionality of the planning service 106, the application service 108 and the configuration service 112 may be provided by one or more application servers, Web servers, data storage systems, network appliances, dedicated hardware devices, and/or other server computers or computing devices. More details regarding the operation of the application service 108 and the planning service 106 are provided below.

The computing device 102A can be configured to execute an operating system 122 and one or more applications such as, an application 124A, an application service API 126, other applications 131, as well as other application programs or components. In some examples, the application 124A is a game application. The other applications 131 might include one or more Web browser applications, one or more productivity applications (e.g., word processing, spreadsheet, and/or presentation applications), one or more design applications, or any other applications. In some embodiments, the other application(s) 131 may be configured to utilize the application service API 126. Although the computing devices 102B-102N are not shown in the same detail as the computing device 102A, it should be understood that the computing devices 102B-102O may be identically configured or may have more or fewer application programs and/or components than are illustrated for the computing device 102A.

The application service 108 may be configured to provide support for the applications 124. For example, as discussed in more detail below, the application service 108 may utilize the planning service 106 that generates plans 120 that are used by applications 124 when executing. In some examples, the applications 124 (may be operative to provide features such as, but not limited to, single player gaming, online cooperative multiplayer gaming, online competitive gaming, chat features, messaging features, online leaderboards, achievement tracking features, advertising features, marketplace features, and the like.

The applications 124 may be configured to provide an interactive video experience whereby one or more users can control or otherwise interact with visual content that is presented on a display. The visual content can include, but is not limited to, characters, levels, maps, areas, stages, worlds, spaces, shapes, and objects. The visual content can be two-dimensional, three-dimensional, or a combination thereof. The applications 124 might also provide audial content such as, but not limited to, music, speech, and sound effects. The application 124 might also provide haptic feedback, such as vibration feedback.

The application 124 may provide one or more tasks that the user can complete in order to move to a different defined state in the application. A task can generally include anything one or more users (or players in a game) can do by interacting with the visual content, or other types of content, provided by the application 124. As a simple example, a task might be completion of a level in a game. For example, a player in a game may control a virtual character to traverse a level from a pre-defined starting point (e.g., a level starting state) to a pre-defined end point (e.g., a level completion state) so as to complete or "beat" the level. A further task might be to complete the level under a specified period of time. In some examples, the completion of a game task might be a "goal state." As described in more detail below, a goal state may be any specified goal or goals that may be reached by performing actions in an application. It should be understood that these examples are illustrative, and should not be construed as being limiting in any way. For example, while most of the examples provided herein relate to a game application, in some embodiments, the application might be any type of application (e.g., a productivity application).

Input to the application 124A can be provided via one or more input devices that are connected to or otherwise are in communication with the computing device 102A. Input to the application 124A can be used to control aspects of the application 124A, such as, for example, controlling characters, navigating menus, and control towards completion of one or more tasks. The computing device 102A may also be configured to present the visual content provided by the application 124A on one or more display devices that are built-in to or are external to and in communication with the computing device 102A, such as a display 116A.

The display 116A is an output device configured to present information in a visual form. In particular, the display 116A may present visual content provided by the application 124A, graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 116A is a liquid crystal display ("LCD") utilizing any active or passive matrix technology and any backlighting technology (if used). In other embodiments, the display 116A may be an organic light emitting diode ("OLED") display. Other display types are contemplated. In addition, the display 116A can include an input device such as a touchscreen or multi-touch enabled touchscreen.

All or a portion of the applications 124 may utilize an application service API 126 to interact with the planning service 106, the application service 108 and/or the configuration service 112. In some examples, the application service 108 is a gaming service and the application service API 126 is a gaming service API. The applications 124 may be configured to call one or more methods exposed by the application service API 126 to access the application service 108 via the network 130 to take advantage of one or more of the features provided by the application service 108. The applications 124 can also be configured to call one or more methods exposed by the application service API 126 to access the planning service 106 via the network 130. For example, the application service API 126 may be used by the application 124A to send events 119A to the planning service 106 and to receive one or more plans, such as a plan 120A that includes actions 118A that may be used to move the execution of the application to a goal state 117A. In some examples, the applications 124 may be configured to receive one or more plans, such as the plan 120A, from the configuration service 112. In these examples, the configuration service 112 may obtain the plans from the planning service 106.

Figure 4:
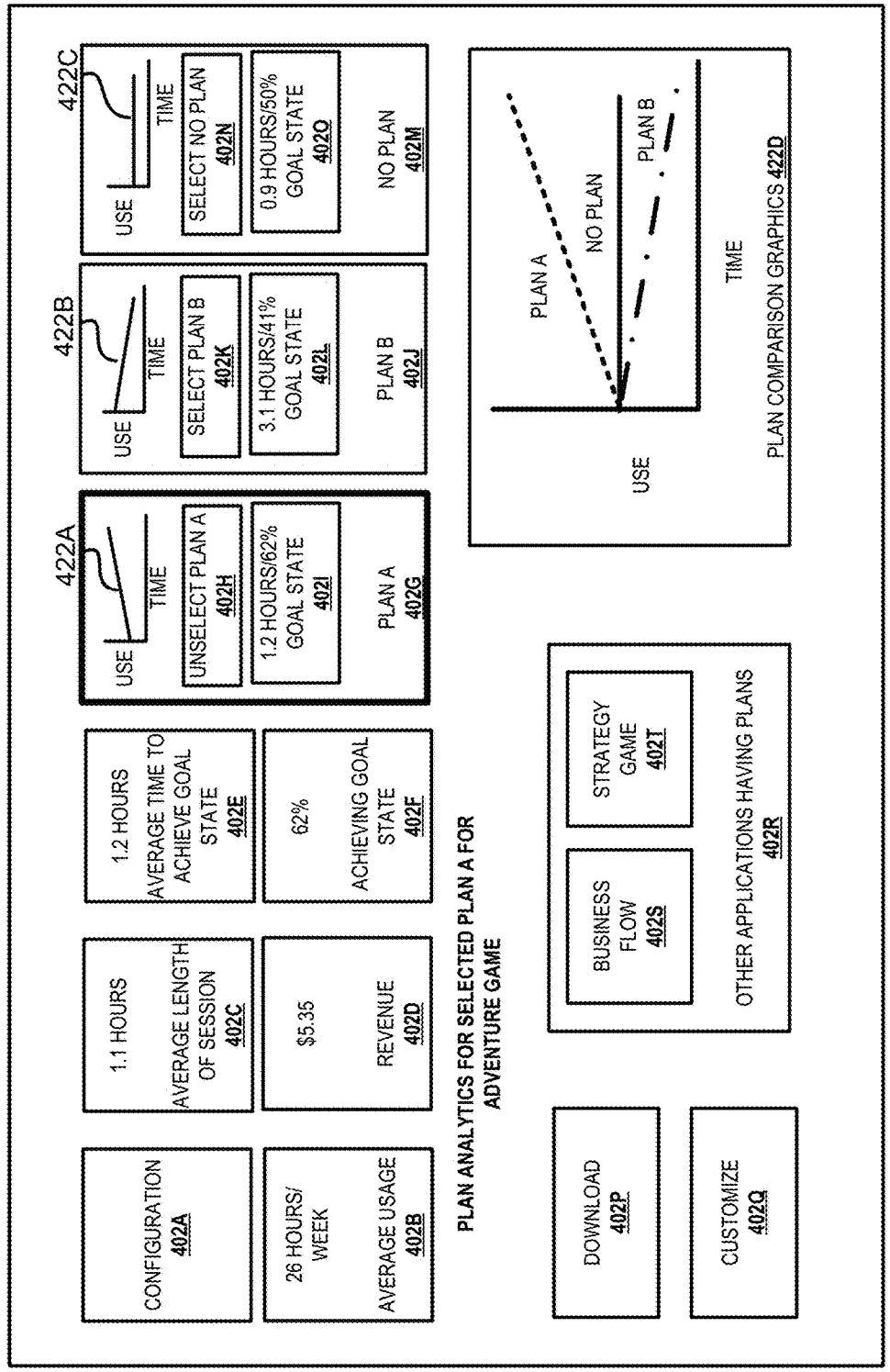
FIG. 4 is a screen diagram showing an illustrative graphical user interface ("GUI") that displays plan analytics.

A software developer, such as the user 132O, may interact with the configuration service 112 using the computing device 102O. In some examples, the software developer, or some other authorized user, may interact with the configuration service 112 to configure one or plans 120 and/or to receive information relating to the plans. For example, the software provider may access the configuration service 112 to configure one or more goals states 117, customers associated with a particular plan or no plan, select information to be provided to the software provider (e.g. plan analytics such as illustrated in FIG. 4), and the like. In some examples, the UI 152 that is displayed on the display 116O may be used to view and interact with the configuration service 112. In other examples, the application service API 126 may be used to interact with the configuration service. In some configurations, the configuration service 112 may communicate with the application, such as the application 124A. For example, the configuration service 112 may communicate to receive or set configuration information associated with the application 124A. The configuration information might include user or application settings such as but not limited to difficulty settings, weapons choices in a game, speed of play in a game, electronic marketplace preferences, advertising settings, and the like.

As described above, an application, such as the application 124A, may be associated with one or more goal states 117A. For example, the goal state 117A may be to complete a task (e.g., complete a level, acquire a new skill) or to reach some other goal (e.g., make a purchase from the electronic marketplace 160). In some cases, a user may be unable to complete a task. For example, the task may be too difficult for the user to complete, the user may be disinterested in the task but is interested in a subsequent task, the user lacks the time required to complete the task, or for any number of other reasons.

In order to assist the user to complete the task and to reach the goal state 117A, the plan manager 110A may provide a plan 120A to configuration service 112 and/or the computing device 102A. As discussed herein, the plan 120A includes data that defines one or more actions 118A for the application 124A that might be performed to move a user 132A interacting with the application 124A toward the goal state 117A. For example, actions 118A included in the plan 120A that might be performed may include decreasing a difficulty level, of the application 124A, increasing the difficulty level of the application 124, providing a hint to the user 132A on the display 116A, and the like for the application 124A. When the application 124A is a game, the actions 118A included in the plan 120A that might be performed include changing a game experience (e.g., increasing a strength of a virtual character in the application 124A, providing a virtual character special skills, and the like).

As illustrated, the planning service 106 includes the plan manager 110A that manages one or more application sessions during which a computing device, such as the computing device 102A, executes the application 124A. The planning service 106 may support connections to any number of computing devices 102 so that one or more users utilizing the various computing devices 102 can share data with the application service 108, the configuration service 112, and possibly with one another. As such, the illustrated example is merely illustrative, and should not be construed as being limiting in any way.

The plan manager 110A may generate a plan, such as the plan 120A, that includes data that may be used by the application 124A to assist in moving the application 124 and/or the user 132A toward the goal state 117A. The plan 120A may be customized for a user of the application 124A. The plan manager 110A may use events 119A that are received from the application 124A as well as events 119B-119N that may be received from the computing devices 102B-102N to generate the plan 120A or when generating the plans 120B-120N.

As discussed in more detail below with reference to FIG. 2, the plan manager 110A may detect patterns of actions 118A that move the application 124A and/or the user 132A from one state (e.g. a start of a game level) to another state (e.g., completion of the level or some state in between). The patterns might be detected using event data obtained from a single application 124A or the patterns might be detected from aggregated events that are obtained from other computing devices, such as computing devices 102B-102N where the application 124A is executed.

A goal state 117A may be defined by a software developer of the application 124A or some other authorized user. The application 124A may have multiple goal states. A goal state 117A can be discrete in that it is not linked in any way to another goal state. Alternatively, a goal state 117A may be linked or otherwise combined with one or more other objectives. As discussed herein, a goal state 117A can be as simple as completing a level, interacting with the application 124A for a specified period of time, interacting with certain features provided by the application 124A (e.g., entering a certain menu or selecting a certain menu option such as a "hard" difficulty level), or completing one or more tasks or objectives. Any of these might be associated with an event 119A.

An application, such as the application 124A, may be configured to broadcast data about events as they occur. A client plan manager 110B, the plan manager 110A and the configuration service 112 may receive the data associated with the broadcast events 119A. The received data associated with the events might be stored locally in an event data store 128B (e.g., when not connected to the planning service 106) and/or by the planning service 106 in an event data store 128A (e.g., when connected). Events 119B-119N that are broadcast to the client plan manager 110B, the plan manager 110A and/or the configuration service 112 may be defined by the software developers of the application 124A, by the application service 108, or by some other entity. Similarly, the actions 118A that might be performed by an application 124A may be defined by the software developers of the application 124A, by the application service 108, or by some other entity.

In some embodiments, the application service 108 provides an electronic marketplace 160 through which users can purchase content, such as, for example, applications, the applications 124, application add-ons, in-application items, music, e-books, movies, and the like. It should be understood that various implementations of the operating environment 100 include multiple networks 130, planning services 106, application services 108, applications 124 and application service APIs 126. As such, the illustrated embodiment should be understood as being illustrative, and should not be construed as being limiting in any way.

Figure 2:
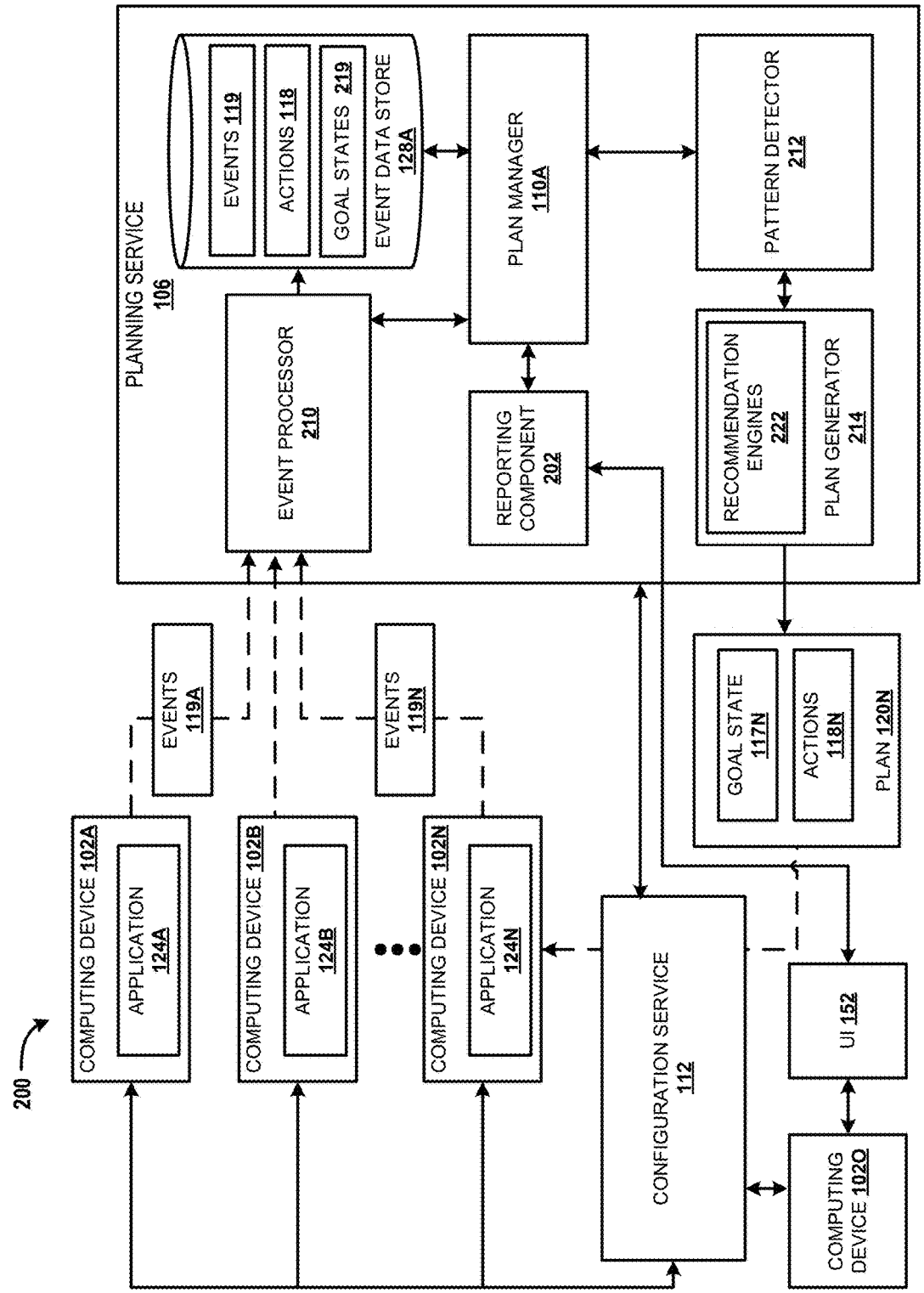
FIG. 2 is a system diagram illustrating a planning service used for determining and providing plans to applications that are determined using events received from the games.

FIG. 2 is a system diagram 200 that illustrates a planning service 106 used for generating and providing plans 120 to applications 124 that are determined using events 119 received from the applications 124. System diagram 200 includes the planning service 106 and the configuration service 112 coupled to the computing devices 102A-102O. The planning service 106 may include an event processor 210, a plan manager 110A, an event data store 128A, a plan generator 214, a reporting component 202, and a pattern detector 212. Each of the computing devices 102A-102N may include the applications 124A-124N that are configured to interact with the planning service 106. In some examples, the applications 124A-124N are game applications.

As discussed above, the applications 124 on the computing devices 102 may be configured to generate events 119A-119N (e.g., event data) that are received by an event processor 210. The event processor 210 may receive and store the events 119 in the event data store 128A, or some other data store or memory. In some examples, the event processor 210 may receive the events 119 as they are broadcast from one or more of the computing devices 102. In other examples, the event processor 210 may be configured to establish a network connection with the applications 124 on the computing devices 102 to obtain the events 119.

As discussed above, the plan manager 110A may be configured to manage the receiving of events 119, generating the plans 120 and delivery of the plans 120 to the applications 124. In some examples, the plan manager 110 may utilize a pattern detector 212 to detect patterns in the events 119. Generally, the pattern detector 212 detects the actions 118 which, when performed, move the application 124 toward the goal state 117N. For example, the goal state 117N in the plan 120N for the application 124N might be to extend an application session. The pattern detector 212 might examine the stored events 119 and the associated actions 118 to determine the action, or actions 118, that when performed move the application 124 toward one or more of the goal states 117.

The plan generator 214 may be configured to utilize patterns that are detected by the pattern detector 212 to generate one or more plans 120 for an application 124. As discussed above, the plans 120 might be customized for the user interacting with the application 124 or might be plans developed using events 119 from other users interacting with the application 124. The plan that is provided to the application might be based on one or more goal states 117 that are associated with the application 124. Generally, the plans 120 that are determined by a plan generator 214 include actions 118 that are used by the application 124 using the plan 120N to determine the actions 118 to perform in response to an occurrence of an event (e.g., a state change). In the current example, the plan generator 214 generates the plan 120N that defines the actions 118N used to move toward the goal state 117N for the application 124N.

The planning service 106 might utilize one or more recommendation engines 222 to determine the actions 118 to include within the plans 120 to move the user playing the application 124 toward the goal state 117. As illustrated, recommendation engines 222 are part of the plan generator 214. The recommendation engines 222 may use events and actions obtained from the computing device 102N as well as other customer computing devices 102A-102N. For example, the recommendation engines 222 may be used to detect patterns from the different applications 124 that lead to a specified goal state 117.

Using the detected patterns, the plan generator 214 may determine the next action, or set of actions, that are to occur within an application, such as the application 124N. The plan generator 214 may determine which actions, when performed, may result in a desired outcome. As discussed above, the plans determined by the plan generator 214 and provided to the application 124 as data, such as the application 124N, are directed to moving application 124N toward the goal state 117N using one or more of the actions 118N. For example, if the application 124N is a game, the plan 120N might include an action 118N to decrease the difficulty of a level of the game such that the user might more easily complete the level. In some cases, completing the level might be the goal state 117N. In other cases, completing the level might be one way that moves the user closer to the goal state 117N.

A game application developed that utilizes the application service API 126 may specify a goal state 117 for a user to complete a level of a game, to complete the level of the game within a specified period of time, to extend the duration of a gaming session, to increase a skill level, to buy more accessories, and the like.

The reporting component 202 may be configured to provide information relating to one or more plans. For example, the reporting component 202 included in the planning service 106 may be configured to provide a graphical user interface ("GUI"), such as the GUI 400 illustrated in FIG. 4, that displays plan analytics. The plan analytics may be displayed on the UI 152 that is associated with the computing device 102O that may be utilized by a software provider, or some other authorized user. The reporting component 202 may also be configured to create reports that include information relating to plans (e.g., usage information, time to achieve goal state, customers achieving the goal state).

The application 124N may periodically connect with the planning service 106 and/or the configuration service 112 to obtain an updated plan 120N. More details regarding the plans 120 are provided below with the discussion of FIG. 3.

Figure 3:
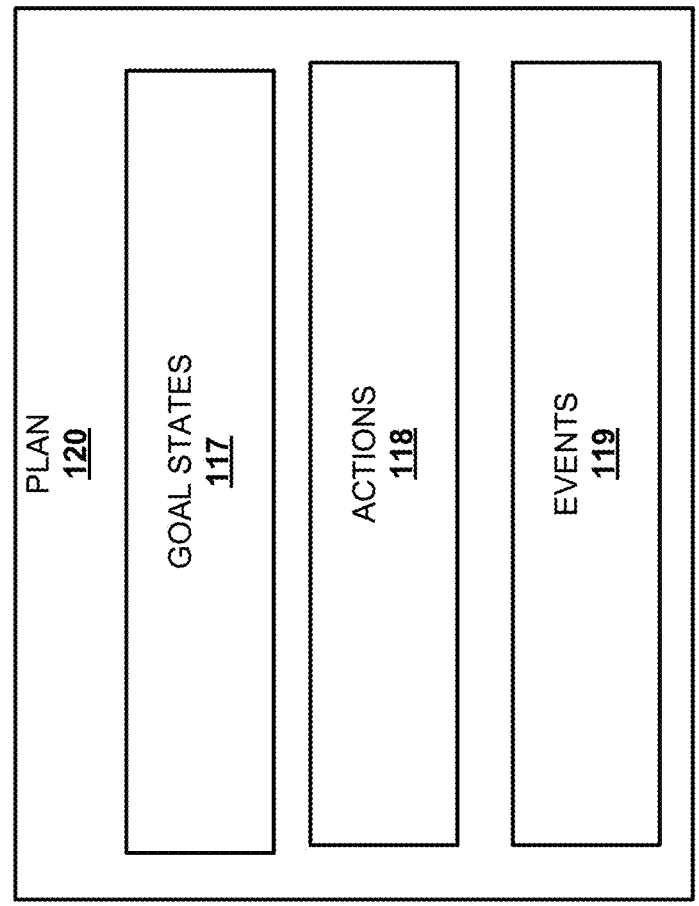
FIG. 3 is a block diagram illustrating a plan that might be used by an application when selecting actions to perform.

FIG. 3 is a diagram 300 that illustrates a plan 120 that might be used by an application 124 when selecting actions 118 to perform. As illustrated, the plan 120 includes one or more goal states 117, the events 119 and the actions 118.

As discussed above, a plan 120 might include one or more goal states 117 that are specified by the software developer, or some other authorized user, for the application 124 receiving the plan 120. More than one goal state 117 may be associated with the plan 120. For example, a software developer might specify short-term goal states 117 to move the user toward completing a level and a longer-term goal state 117 of extending the average duration of the gaming sessions for a user playing the game.

The actions 118 defined in the plan 120 may be performed by the application 124 using the plan 120 to move between one or more states of the application 124. For example, the actions 118 that are included in the plan 120 that when performed by the application 124 might result in changing a difficulty level of the application 124, increasing or decreasing the strength of a virtual character in the application 124, providing a hint, accessing an electronic marketplace 160, presenting a promotion, and the like.

The actions 118 may be specified by the software developer and/or be included as functionality within the application service API 126. As discussed above, the plan 120 may include different actions 118 that may be used to reach the same goal state 117. In some cases, a plan 120 that is provided to one application 124 is different from the plan 120 that is provided to another application 124 even though the goal state 117 of each plan 120 is the same.

The events 119 may identify the different states of the application 124 at which an associated action 118 or actions 118 may be performed. In some examples, different actions 118 might be performed by the application 124 to move the user toward the goal state 117. The plans may be different for different users.

FIG. 4 is a screen diagram showing an illustrative graphical user interface ("GUI") 400 that displays plan analytics. As illustrated, the GUI 400 shows plan analytics relating to an application. In the current example, the GUI 400 shows plan analytics relating to the "adventure game" application purchased by a customer of the electronic marketplace 160. The GUI 400 might be determined by a computing device associated with the planning service 106, the configuration service 112, or some other computing device. The GUI may be presented on a computing device, such as the computing device 102P that may be utilized by a software provider of the adventure game application.

As discussed above, one or more plans that are dynamically determined may be used by an application to move toward one or more goal states. For purposes of explanation, and not intended to be limiting, assume that the GUI 400 is being used by a software provider to view plan analytics relating to the "adventure game" application that is associated with two plans and a control group that does not follow a plan. In the current example, a first group of customers of the software provider that executes the adventure game are associated with plan A, a second group of customers is associated with plan B and a third group of customers is associated with no plan (i.e. the control group).

The GUI 400 might display a variety of different plan analytics and UI elements. In the current example for the adventure game application, the GUI 400 shows a configuration UI element 402A, an average usage UI element 402B, an average length of session UI element 402C, a revenue UI element 402D, an average time to achieve goal state UI element 402E, and an achieving goal state UI element 402F for a currently selected plan that is associated with the adventure game application. In the current example, the currently selected plan is "plan A" as indicated by the bolded line displayed around the plan A UI element 402G.

The average usage UI element 402B may display an average number of hours that the adventure game application is used during a time period (e.g., daily, weekly, monthly). In the current example, the average usage UI element 402B is configured to display a number of hours for average weekly use by a customer. The average length of session UI element 402C may display an average length of time that the adventure game application is used each time the application is executed. The revenue UI element 402D may display an average revenue generated during a specified time period. In the current example, the revenue UI element 402D shows an amount of revenue generated during one week. The average time to achieve goal state UI element 402E may display the average amount of time it takes a customer to reach a specified goal state for the currently selected plan. The achieving goal state UI element 402F may display information relating to the number or percentage of the customers that achieve the specified goal state. In the current example, 62% of the customers associated with plan A achieve the goal state.

In some examples, all or a portion of the different UI elements might be selected to obtain additional information or configure different options. For instance, a software provider, or some other authorized user, might select the configuration UI element 220A to configure options (e.g., using the configuration service 112) that are associated with one or more of the plans for the currently selected application (e.g., the adventure game application). As discussed above, the options might relate to configuring a plan (e.g., associating customers with a particular plan, setting/changing a goal state). Other UI elements might be selected by the software provider to obtain additional information.

The GUI 400 may also display UI elements that provide a summary of information relating to plans that are associated with an application. In the current example, the GUI 400 may display a plan A UI element 402G that displays information about plan A, a plan B UI element 402J that displays information about plan B and a no plan UI element 402M that displays information about customers that are not associated with a plan. Each of the plan UI elements 402G, 402J and 402M may display a select plan UI element (e.g., selection UI elements 402H, 402K and 402N) for changing the currently selected plan.

The software provider might select the select plan UI element 402K to change the currently selected plan from plan A to plan B. In response to changing the plan, the plan analytics displayed in the UI elements 402B-402F may be updated to reflect the currently selected plan (e.g., from plan A to plan B). As illustrated, each plan UI element also shows a summary UI element indicating how the plan is performing. In the current example, the summary UI elements 402I, 402L and 402O show an average time to achieve the goal state and a percentage of users associated with the plan that achieve the goal state.

In some configurations, the plan UI elements 402I, 402L and 402O each display a graph (e.g., graphs 422A, 422B and 422C) that illustrate graphically how the plan is performing. In the current example, the software provider may see by referring to graph 422A that the usage of the adventure game is increasing for customers associated with plan A, that the usage is decreasing for customers associated with plan B by referring to graph 422B, and that the usage is steady for customers associated with no plan by referring to graph 422C.

The plan comparison graphics 422D shows a graph that illustrates how each plan is performing as compared to other plans or no plans. The software provider may easily see by referring to the plan comparison graphics 422D how each plan is performing relative to the other plans that are associated with the adventure game application.

A software provider might select one of the UI elements shown in the other applications having plans UI element 402R to change the currently selected application. For example, selecting either the business flow UI element 402S or the strategy game UI element 402T may change the display of GUI 400 to reflect the newly selected application.

A software provider, or some other authorized user, might also be able to customize the GUI 400 by selecting the customize UI element 402Q. In response to selecting the customize UI element 402Q, a user may then be prompted to select the different information that they would like to include in the display of the GUI 400. For example, a user may select from a list (or some other UI element or input method) the plan analytics that they would like displayed. In another example, the user may select how the plan analytics is to be displayed. For example, the user may request to have the plan analytics displayed as raw data, as a graphical representation (e.g., tables, charts, graphs), or in some other format. A user may also request to have historical information displayed in the GUI 400. For example, a user may request to see a time series display of the usage of the application, or some other data.

The information presented in the GUI 400 might also be downloaded for later use. As illustrated, a user may select the download UI element 402P to download the information to a local data store, a network data store, or to another location. The plan analytics may be downloaded in one or more formats. For example, a user may download all or a portion of the customer support information as a text file, a spreadsheet file, a word-processing file, or some other file.

Figure 5:
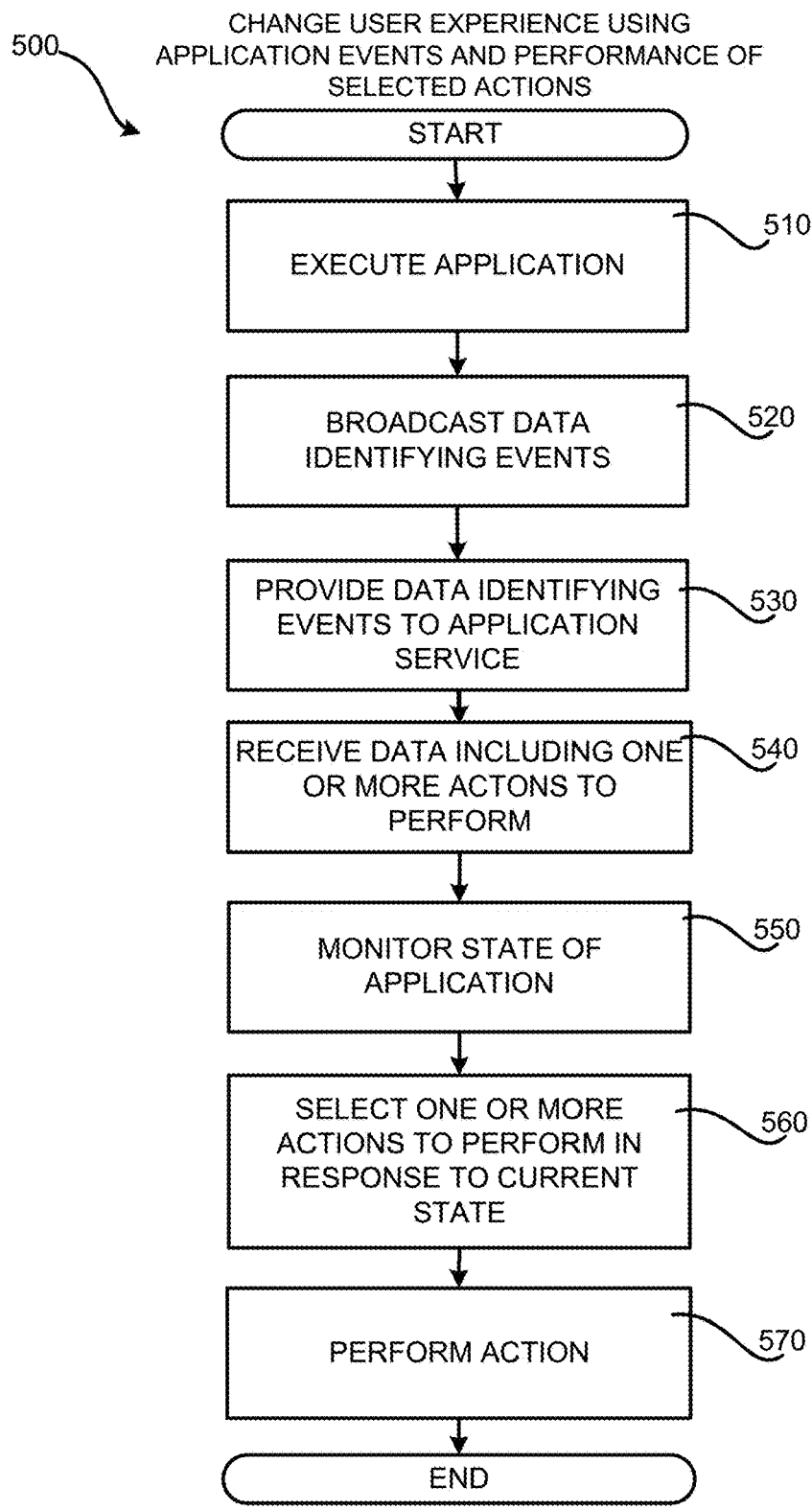
FIG. 5 is a flow diagram showing a routine illustrating aspects of a mechanism disclosed herein for changing a user experience using application events and following a plan including actions while an application is executing.
Figure 6:
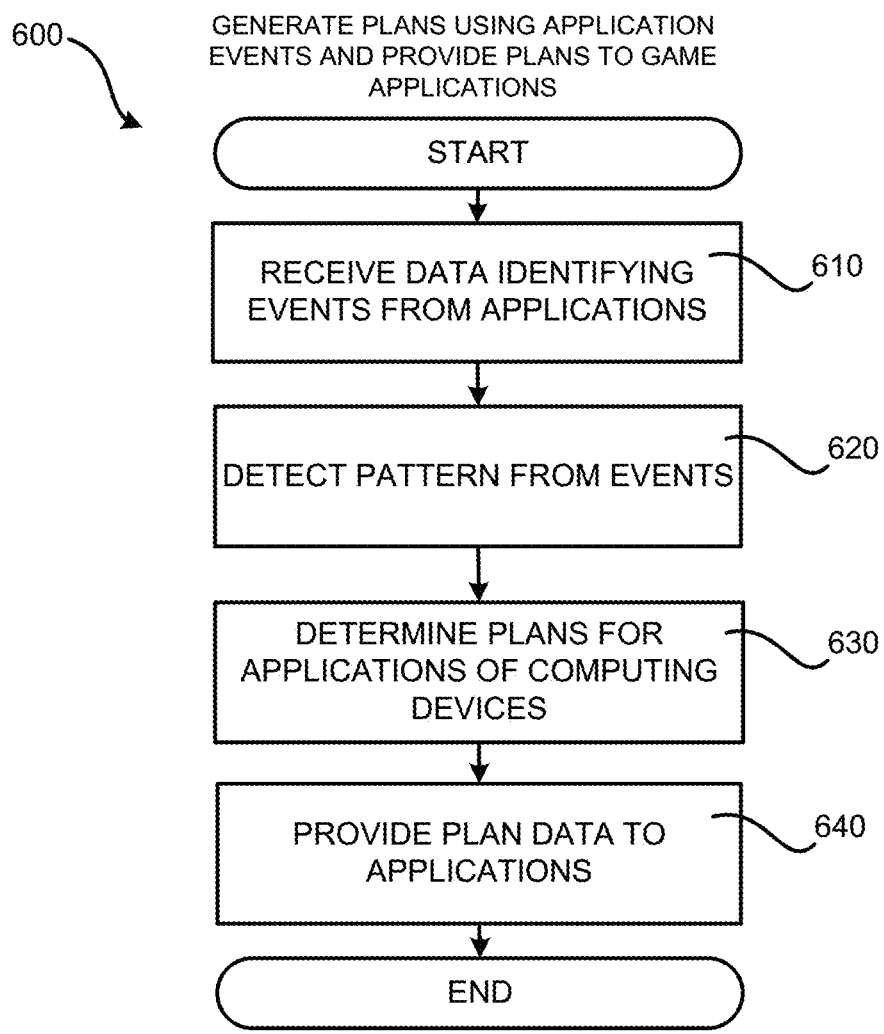
FIG. 6 is a flow diagram showing a routine illustrating aspects of a mechanism disclosed herein for generating and providing plans that include actions that may be selected by an application.

FIGS. 5-6 are flow diagrams showing routines that illustrate aspects of changing application behavior in response to an occurrence of one or more events, according to an embodiment disclosed herein. It should be appreciated that the logical operations described herein with respect to FIGS. 5-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 5 is a flow diagram showing a routine 500 illustrating aspects of a mechanism disclosed herein for changing a user experience using application events 119 and following a plan 120 including actions 118 while an application 124 is executing. The routine 500 may begin at operation 510, where an application 124 is executed. As discussed above, the application 124 may be executed on a computing device 102, or some other computing device. In some examples, the application 124 utilizes an application service API 126 that provides functionality to broadcast events 119 to the application service 108 and/or the configuration service 112 and to receive plans 120 generated by a planning service 106 to assist a user 132 executing the application 124 to move toward or reach a goal state 117 or assist the application 124 to reach the goal state 117.

From operation 510, the routine 500 may proceed to operation 520, where data identifying events 119 associated with the application 124 might be broadcast. As discussed above, the events 119 may be associated with different states of the application. The events 119 may be predefined events or software developer defined events. Example predefined events might include when a user begins using the application, begins playing the game, when the user accesses the electronic marketplace, when the user makes a purchase, when the user accesses help, when the user shares information with one or more other users, and the like. Examples of events 119 that might be defined by the software provider of a game might include when a player character dies in the game, moves to a next level, encounters a specified character in the game, acquires a new skill, and the like. In some examples, the broadcast data for the events 119 may first be received by a client plan manager 110B before being provided to the application service 108. In other examples, the events 119 might be received by the configuration service 112.

From operation 520, the routine 500 may proceed to operation 530, where the data identifying the events 119 may be provided to the application service 108. As discussed above, the data identifying the events 119 might be provided to the application service 108 when a network connection is established between the computing device 102 and the application service 108. In some examples, the client plan manager 110B is configured to attempt to establish a connection with the plan manager 110A that is part of the application service 108 during a time the application 124A is executing on the computing device 102A. The data identifying the events 119 might also be provided to the configuration service 112 when a network connection is established between the computing device 102 and the configuration service 112.

From operation 530, the routine 500 may proceed to operation 540, where data including one or more actions to perform (e.g., one or more plans 120) are received from the application service 108 or the configuration service 112. As discussed above, the plans 120 might be customized for the user interacting with the application 124 (e.g., playing a game) or might be plans developed from events 119 from other users 132 interacting with the application 124. The plans 120 that are provided to the application 124 might be based on one or more goal states 117 that are specified by the software developer. The plans 120 may be determined by the planning service 106 for the application 124 to assist in moving the user of the application 124, or the application 124, to a goal state.

From operation 540, the routine 500 may proceed to operation 550, where the state of the application 124 may be monitored. As discussed above, in some examples, the state of the application 124 relates to the events 119 that occur during an execution of the application 124. For example, an event in which a player character dying might be the current state of the game. In some examples, the client plan manager 110B on the computing device 102A may monitor the states. In other examples, the plan manager 110A may monitor the states.

From operation 550, the routine 500 may proceed to operation 560, where one or more actions 118 may be selected by the application 124 to perform. As discussed above, the application 124 may be configured to select one or more actions 118 to perform based on a current state of the application. For example, if a current state is that a player character dies, the action might be to change the game playing experience (e.g., decrease the difficulty of the level or to provide a hint). As a result, the user 132 might be able to complete the level the next time the user 132 attempts to complete the level of the game.

From operation 560, the routine 500 may proceed to operation 570, where the selected action or actions 118 are performed. The actions 118 might be performed directly by the application 124 or by another component. For example, the client plan manager 110B might be configured to perform the selected actions 118. In other examples, the configurations service 112 may be configured to directly change settings for the application 124A. Routine 500 may then proceed to an end operation. Alternately, the routine 500 might proceed back to repeat some or all of the processing operations described above. For example, from operation 570, the routine 500 may proceed back to operation 520.

FIG. 6 is a flow diagram showing a routine 600 illustrating aspects of a mechanism disclosed herein for generating and providing plans 120 that include actions 118 that may be selected by an application 124. The routine 600 may begin at operation 610, where data identifying the events 119 from applications 124 are received. As discussed above, the data identifying the events 119 are received from the applications 124 that are executing or have executed on different computing devices 102.

From operation 610, the routine 600 may proceed to operation 620, where patterns may be detected from the received events 119. As discussed above, the pattern detector 212 may detect patterns from the received events 119 that move the execution of the application 124 from one state to another state.

From operation 620, the routine 600 may proceed to operation 630, where one or more plans 120 may be determined for an application 124. As discussed above, the plans 120 may be customized for the user 132 of an application 124. In some examples, the plan generator 214 determines the plans 120 using detected patterns determined by the pattern detector 212.

From operation 630, the routine 600 may proceed to operation 640, where the plan data (e.g. one or more plans 120) are provided for use by the application 124. As discussed above, the plans 120 might be provided to the application 124 while executing, or at some other point. For example, the plans may be provided before the application 124 begins executing. In other examples, the plans may be provided to the configuration service 112. The routine 600 may then proceed to an end operation. Alternately, the routine 600 might proceed back to repeat some or all of the processing operations described above. For example, from operation 640, the routine 600 may proceed back to operation 610.

FIG. 7 and the following description are intended to provide a brief, general description of a suitable computing environment in which the embodiments described herein may be implemented. In particular, FIG. 7 is a system and network diagram that shows an illustrative operating environment that includes a service provider network 720. As discussed above, service provider network 720 can provide virtual machine instances and computing resources on a permanent or an as-needed basis.

The computing resources provided by the service provider network 720 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 720 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein will be described below with regard to FIG. 8.

The users and customers of service provider network 720 may access the computing resources provided by the data centers 704 over a suitable data communications network, such as a Wide Area Network ("WAN"), as illustrated by network 130. Although a WAN might be used, it should be appreciated that a local-area network ("LAN"), the Internet, or any other networking topology known in the art that connects the data centers 704 to the computing devices 102 may be utilized. It should also be appreciated that combinations of such networks might also be utilized.

Figure 8:
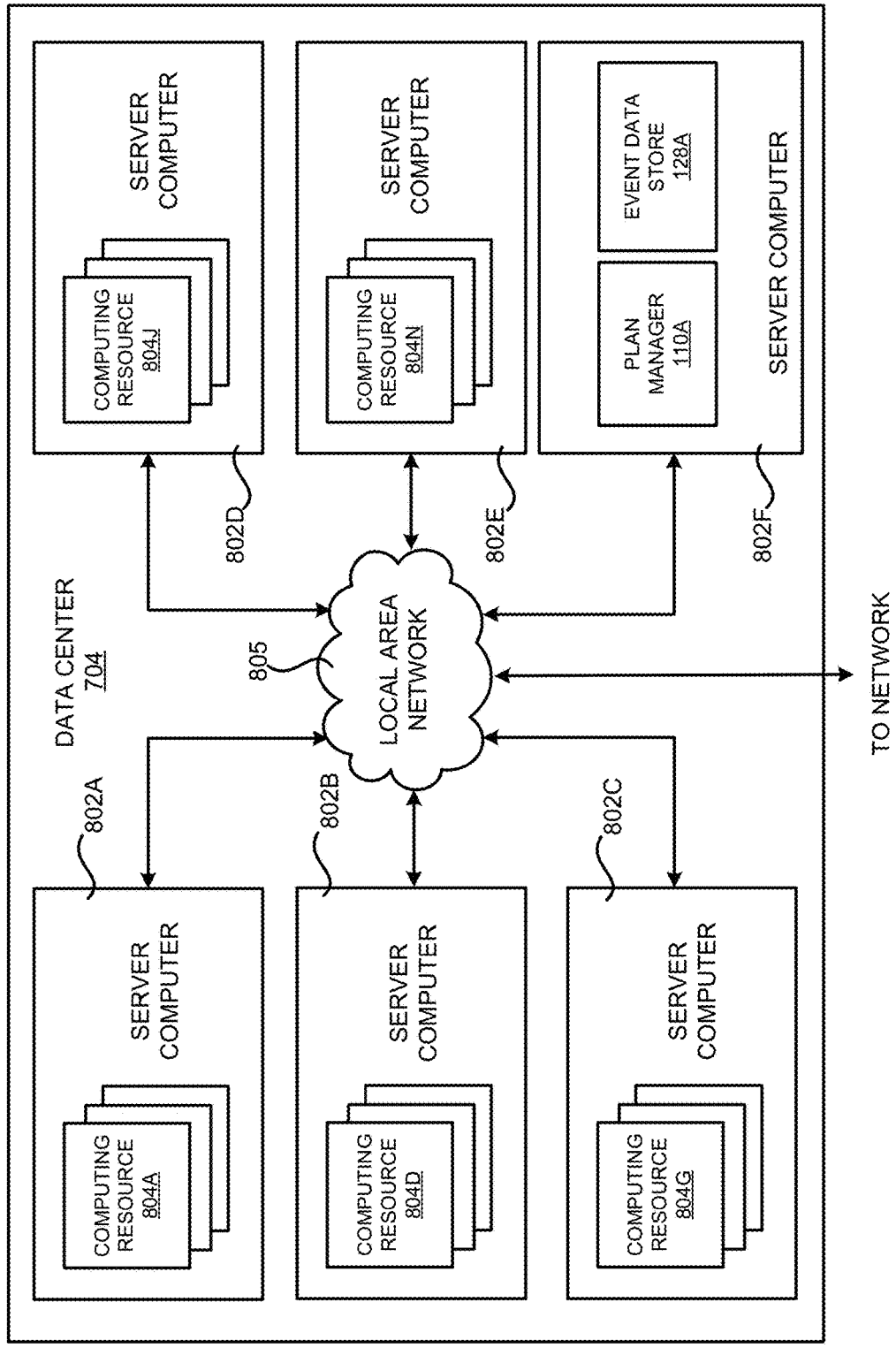
FIG. 8 is a computing system diagram that illustrates one configuration for a data center that implements aspects of a service provider network, including some or all of the concepts and technologies disclosed herein in which a user experience may be changed using application events and selected actions.

FIG. 8 is a computing system diagram that illustrates one configuration for a data center 704 that implements aspects of a service provider network 720, including some or all of the concepts and technologies disclosed herein in which a user experience may be changed using application events and selected actions. The example data center 704 shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an embodiment, the server computers 802 are configured to execute the software products as described above.

In one embodiment, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the embodiments disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 802F reserved for executing software components for managing the operation of the data center 704, the server computers 802, virtual machine instances, and other resources within the service provider network 720. The server computer 802F might also execute the plan manager 110A and include the event data store 128A. Details regarding the operation of each of these components has been provided above. In this regard, it should be appreciated that while these components are illustrated as executing within service provider network 720, computing systems that are external to service provider network 720 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the network 130 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 802A-802F in each data center 704 and between virtual machine instances and other types of computing resources provided by the service provider network 720.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
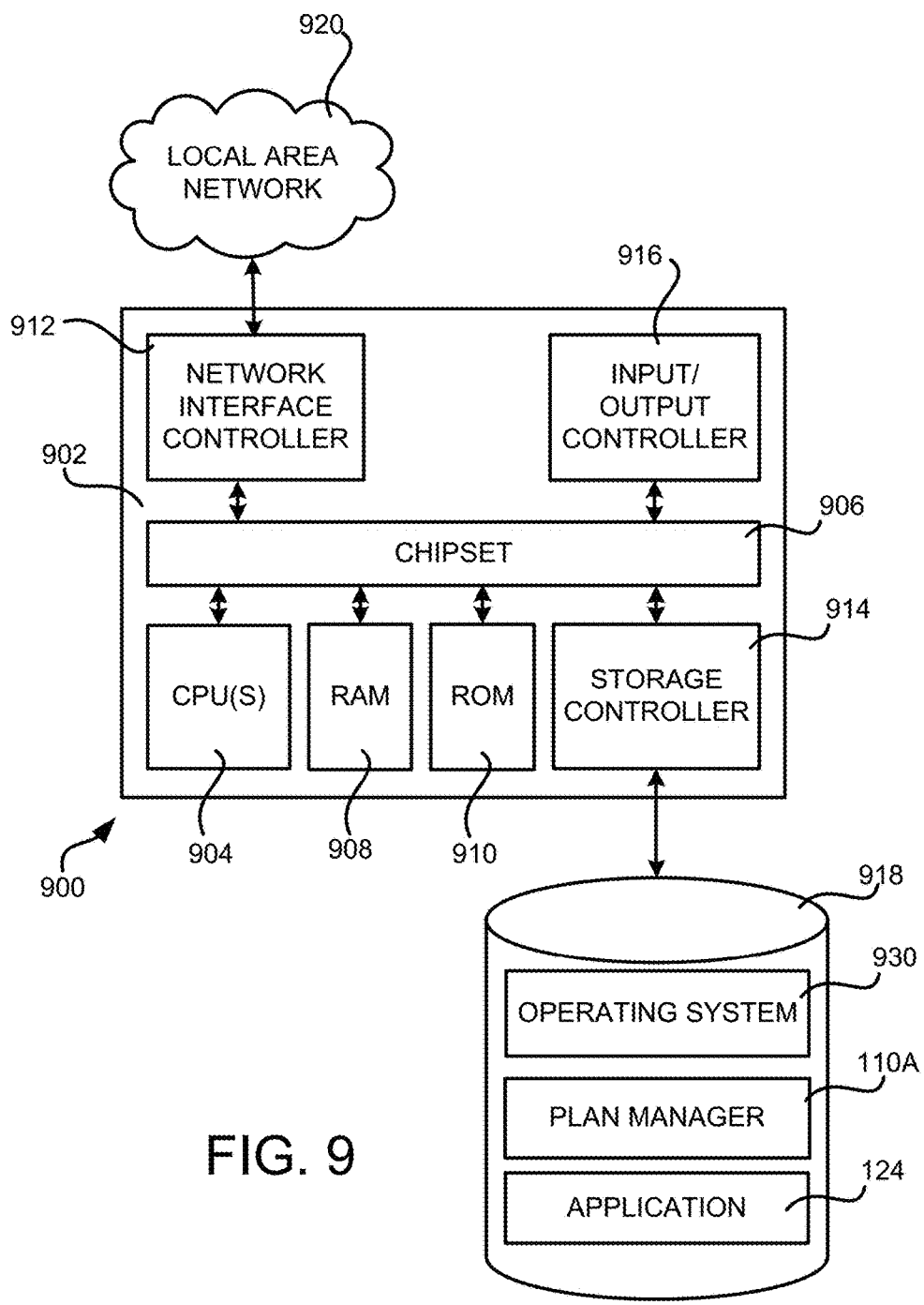
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing program components for changing a user experience during an execution of an application in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a computing device 102, a computing device utilized in the application service 108 or the planning service 106 or any other of the computing systems described herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX operating system or the ANDROID operating system. It should be appreciated that other operating systems may also be utilized. The mass storage device 918 may store other system or application programs and data utilized by the computer 900, such as components that include the plan manager 110, the application 124 and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 5-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for changing a user experience while executing an application have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system, comprising:
at least one non-transitory computer-readable storage medium to store instructions which, in response to being performed by one or more processors, cause the system to:
generate a first plan to indicate one or more first possible choices available to a user of a software application in response to an event occurring within the software application;
modify performance of the software application executing on a computing device remote from the at least one non-transitory computer-readable medium based, at least in part, on the first plan and at least one choice of the one or more first possible choices made by the user;
generate a second plan to indicate one or more second possible choices available to the user of the software application in response to the event occurring within the application, wherein the one or more second possible choices are different from the one or more first possible choices; and
modify performance of the software application executing on the computing device based, at least in part, on the second plan and at least a choice of the one or more second possible choices made by the user.

2. The system of claim 1, wherein instructions further cause the system to:
determine that the software application has failed to transition to a goal state, and
wherein generating the first plan comprises determining that the one or more first possible choices, when selected, move the software application closer to the goal state.

3. The system of claim 2, wherein the software application is a first instance of the software application included on a first computing device, and the instructions further to cause the system to:
receive, from a second computing device, application usage data indicating that a second instance of the software application has transitioned to the goal state based at least in part on at least one of the one or more possible choices; and
wherein determining that the one or more first possible choices move the software application closer to the goal state is based at least in part on the application usage data.

4. The system of claim 1, wherein the software application is configured to detect an occurrence of the event during execution of the software application, and determine an action to take in response to the occurrence based, at least in part, on the first plan.

5. The system of claim 1, wherein the instructions stored thereupon to cause the system to:
receive from the computing device a request to acquire the software application; and
transmit, based at least in part on the request, the software application to the computing device.

6. A computer-implemented method, comprising:
generating, at a first device, a first plan to indicate one or more first possible choices available to a user of a software application in response to an event occurring within the software application;
modifying performance of the software application executing on a second device remote from the first device based, at least in part, on the first plan and at least one choice of the one or more first possible choices made by the user;
generating, at the first device, a second plan to indicate one or more second possible choices available to the user of the software application in response to the event occurring within the application, wherein the one or more second possible choices are different from the one or more first possible choices; and
modifying performance of the software application executing on the second device based, at least in part, on the second plan and at least a choice of the one or more second possible choices made by the user.

7. The computer-implemented method of claim 6, wherein the software application is a first instance of the application, and wherein the method further comprises receiving application usage data associated with a second instance of the application included on a second computing device, and wherein the first plan is identified based at least in part on the application usage data.

8. The computer-implemented method of claim 6, further comprising providing plan analytics, the plan analytics including one or more of usage data, revenue data, and goal state data associated with the application.

9. The computer-implemented method of claim 6, further comprising:
determining that the software application has failed to transition to a goal state, and
generating the second plan comprises determining that the one or more second possible choices, when selected, move the application closer to the goal state.

10. The computer-implemented method of claim 9, wherein the software application a first instance of the application executing on the second device, and further comprising:
receiving, from a third device, application usage data indicating that a second instance of the application has transitioned to the goal state based at least in part on a selection of the one or more second possible choices; and
determining that selection of the one or more possible choices move the application closer to the goal state is based at least in part on the application usage data.

11. The computer-implemented method of claim 6, wherein the one or more first possible choices are defined, at least in part, by a provider of the software application.

12. The computer-implemented method of claim 6, further comprising:
receiving, from the software application, a request for a new plan; and
wherein generating the second plan is based at least in part on the request.

13. A non-transitory computer-readable storage medium having computer-executable instructions stored thereon computer-executable instructions which, when performed by one or more processors of a first computing device, cause the first computing device to:
generate a first plan to indicate one or more first possible choices available to a user of a software application executing on a second computing device remote from the first computing device in response to an event occurring within the software application;
modify performance of the software application based, at least in part, on the first plan and at least one choice of the one or more possible choices made by the user;
generate a second plan to indicate one or more second possible choices available to the user of the software application in response to the event occurring within the application, wherein the one or more second possible choices are different from the one or more first possible choices; and
modify performance of the software application executing on the second computing device based, at least in part, on the second plan and at least a choice of the one or more second possible choices made by the user.

14. The non-transitory computer-readable storage medium of claim 13, the instructions further cause the first computing device to:
receive, from the second computing device, a request to acquire the software application; and
transmit, based at least in part on the request, the software application to the second computing device.

15. The non-transitory computer-readable storage medium of claim 13, wherein the instructions further cause the first computing device to:
receive, from one or more computing devices, application usage data that indicates usage information associated with instances of the software application executing on individual computing devices of the one or more computing devices; and
wherein generating the second plan is based at least in part on the application usage data.

16. The non-transitory computer-readable storage medium of claim 15, wherein the instructions further cause the first computing device to:

determine one or more patterns based on the application usage data; and wherein generating the second plan is based at least in part on the one or more patterns.

17. The non-transitory computer-readable storage medium of claim 13, wherein the instructions further cause the first computing device to:

receive a request from the software application for the second plan; and wherein the second plan is identified based at least in part on the request.

18. The non-transitory computer-readable storage medium of claim 13, wherein at least one of the one or more possible choices, when selected, changes a functionality of the software application.

19. The non-transitory computer-readable storage medium of claim 13, wherein modifying the performance of the software application comprises sending at least a portion of the second plan to the second computing device.

* * * * *